Patented July 13, 1943

2,324,300

UNITED STATES PATENT OFFICE 2,324,300

SULPHONATION PROCESS

Mortimer T. Harvey, East Orange, N. J., assignor to The Harvel Corporation, a corporation of New Jersey No Drawing. Application September 1, 1939, Serial No. 293,057

2 Claims. (Cl. 260—512)

The present invention relates to new aryl-alkyl sulphonic acids and their metal salts and to methods of making the same, and the present invention relates more particularly to sulphonic acids and sulphonic acid salts derived from phenols having unsaturated hydrocarbon substituents on the nucleus thereof and to methods of obtaining sulphonation derivatives without the polymerization reaction which will occur between the hydroxyl group of the phenolic nucleus and the unsaturated bond of the hydrocarbon substituent.

The present application is a continuation in part of my copending application Serial Number 174,662, filed November 15, 1937.

The step of preventing polymerization during the sulphonation process comprises blanketing either or both of the hydroxyl group on the phenol nucleus or the unsaturated group of the hydrocarbon substituent so that they are not reactive toward each other by substituting an aryl or an alkyl group for the hydrogen of the hydroxyl group on the phenolic nucleus or by completely satisfying the unsaturated bond of the unsaturated hydrocarbon substituent on the phenolic nucleus by hydrogenation or reaction with another phenol which is free of unsaturated substituents whereby a di-phenol is formed such as is disclosed in my said copending application Serial Number 174,662.

It will be seen that in the said di-phenols various sulphonic acids can be produced and various degrees of sulphonation can be obtained to suit various needs and that the reaction product can be a mixture of a number of sulphonic acids depending on the degree or extent to which sulphonation is carried on.

The sulphonic acids and the metal and ammonium salts of sulphonic acids of the present invention are suitable for general use where such compounds are used and are particularly suited as detergents and wetting agents and for allied purposes.

Examples of phenols and phenolic ethers suitable for use in the practice of the present invention are the phenols: cashew nut shell liquid, cardanol, marking nut shell liquid, urushiol and the several alkyl ethers of these phenols, preferably those ethers in which the alkyl radicals in ether relation have from one to five carbon and which preferred ethers include the primary, secondary and tertiary alkyl ethers of the above named phenols. Other examples are compounds corresponding to the above named phenols and phenolic ethers but in which the hydrocarbon substituent on the nucleus has had its unsaturated bond satisfied by hydrogenation or by condensation with another phenol which is free of unsaturated substituents to a di-phenol. Some of the above described phenols and ethers at normal temperature are solids, are crystalline in form and have melting points ranging upwardly from about 50.5° C. which is the melting point of hydrogenated cardanol. Further examples, particularly of di-phenols, are given hereinafter.

In the illustrative examples given herein the temperature of reaction given may be below that of the melting point of the pure phenol or phenolic ether used but it is a temperature at which the commercial grade of product will be in a liquid state.

Reference is hereby made to Harvey Patent Number 2,098,824 of November 9, 1937, for a disclosure of the composition of cashew nut shell liquid and its constituents and also of cardanol.

Following are illustrative examples of the methods and products of the present invention.

*Example 1.*—To twenty-five grams of hydrogenated cardanol are added gradually about fifty grams of concentrated sulphuric acid (e. g., 93% to 100% sulphuric acid) and the mixture heated for about one hour at about 110° C., at the end of which time the reaction product is completely soluble in water.

When cold the reaction mass separated into two layers, one, a lower liquid layer which is for the most part sulphuric acid, and, two, a very viscous upper layer which is soluble in normal butyl alcohol.

Said viscous upper layer is separated from the lower layer of sulphuric acid by chilling the reaction mass in a refrigerator and pouring off the sulphuric acid after which said viscous upper layer is dissolved in normal butyl alcohol and washed repeatedly with small quantities of water to remove remainders of sulphuric acid after which the normal butyl alcohol was removed by evaporation.

The yield is about thirty-nine grams which indicates that the disulphonic acid of hydrogenated cardanol is a substantial part or all of the reaction product.

*Example 2.*—About twenty grams each of ethyl ether of hydrogenated cardanol and concentrated sulphuric acid are brought together gradually and then heated at about 110° C. for about one hour. The reaction product is soluble in water.

To the reaction mass is added a quantity of calcium carbonate leaving the mass still acid and the mass filtered and the filtrate is evaporated to dryness. The evaporation residue (the reaction product) is a solid which is soluble in water. The addition of calcium chloride to a solution of the reaction product does not give any precipitate.

The reaction product comprises the disulphonic acid of the ethyl ether of hydrogenated cardanol.

Examples of phenols having unsaturated hydrocarbon side chains but in which latter the unsaturated group has been satisfied by condensation with a phenol to produce di-phenols and corresponding ethers can be represented by the following formula:

(I)

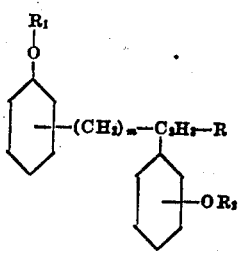

and (II)

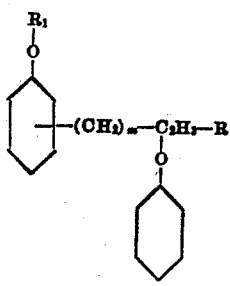

where $m$ is zero or a finite integer, each of R, $R_1$ and $R_2$ can be hydrogen or a hydrocarbon radicle, and each carbocyclic group can be phenyl, naphthyl or anthranyl nucleus, and each carbocyclic group can have attached one or more additional alkyl, hydroxy or alkoxy radicles.

The two Formulas I and II can be condensed to (III)

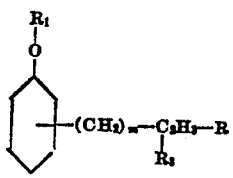

where $R_3$ is an oxy aryl group.

In those cases where $R_1$ is to be a hydrocarbon group, this group can be added after the condensation reaction, or the starting phenolic material having the unsaturated substituent can be a phenolic ether. If the hydrocarbon $R_1$ group is put on after the condensation reaction and the condensation product comes under Formula I, above, the $R_2$ also can be changed from hydrogen to hydrocarbon.

Illustrative specific examples of phenols with unsaturated side chains reacted with other phenols:

*Example A.*—Cardanol and phenol (carbolic acid) ($HOC_6H_4C_{14}H_{27}$ and $C_6H_5OH$).

*Example B.*—Allyl phenol and phenol.

*Example C.*—Cashew nut shell liquid and cresylic acid.

*Example D.*—Dihydroxy urushiol and ortho cresol.

*Example E.*—Allyl phenol and ortho cresol.

*Example F.*—Cardanol and allyl phenol.

*Example I.*—288 parts by weight of cardanol and 94 parts of phenol are added to a solution of 108 parts of concentrated sulphuric acid in 525 parts of glacial acetic acid and left to stand overnight after which the mixture is refluxed for 5 hours. After this the mixture is poured into 2000 parts of hot water (60° C.) and sodium chloride added to cause coagulation and separation. A dark red oil, which separates on top and which can be distilled, is the cardanol phenol condensation product.

*Example II.*—Cashew liquid, cresol and sulphuric acid, 300 parts by weight of cashew nut shell liquid and 104 parts by weight of a mixture of 50 per cent of ortho cresol, 30 per cent of phenol and 20 per cent of metal para cresol are added together and chilled in an ice bath. To this mixture is added, drop by drop, about 100 parts by weight of concentrated sulphuric acid, keeping the temperature below 25° C., after which the mixture is left to stand at room temperature for four days and then washed with water and dehydrated by heating to 130° C.

*Example III.*—300 parts by weight of cashew nut shell liquid and 104 parts of the phenol-cresol mixture mentioned in Example II are mixed together and to this mixture is added a solution of 108 parts of concentrated sulphuric acid which has previously been dissolved in about eight times its volume of mono isopropyl acid sulphate. The mixture is allowed to stand for 3 days at room temperature after which it is poured into water and the mixture brought to a boil and separation allowed to take place over night. The resulting product is dehydrated at low temperature, for example, by heating to 100° C. to 105° C.

*Example IV.*—133 parts by weight of ortho allyl phenol and 94 parts of phenol (carbolic acid) are mixed together to which mixture is added about 98 parts by weight of concentrated sulphuric acid dissolved in about nine times its volume of glacial acetic acid and the whole refluxed 5 hours after which the product is diluted with water and the layers separated. The water layer is removed and the resulting phenol distilled under vacuum.

*Example V.*—One gram molecular weight of cashew nut shell liquid (about 288) and two gram moles of phenol (carbolic acid) are mixed together and cooled to about 20° C. To this mixture is added slowly about 200 parts by weight of concentrated sulphuric acid, keeping the temperature at about 20° C., after which the mixture is left to stand for about four days and then washed with water and dehydrated by heating to 130° C.

*Example VI.*—Three hundred parts by weight of cardanol and one hundred and fifty parts of phenol are dissolved together and one hundred and fifty parts by weight of concentrated sulphuric acid are added gradually while stirring vigorously and keeping the temperature of the reaction mixture between about 30° C. and 40° C. The reaction mass was left to stand over night and then thrown into five volumes of water. The sulphuric acid separates into a separate layer which is drawn off and the remaining reaction product, double phenol, is washed several times with a solution of sodium chloride and then with water. The water can be removed with alcohol when desired and the alcohol removed by evaporation.

*Uses.*—The products of these reactions are considered to be double phenols and they can be used for germicidal and insecticidal purposes by dispersing in an alkaline medium. They also can be reacted with aldehydes such as hexamethylene tetramine, water solution of formaldehyde, or paraformaldehyde with the aid of heat to obtain oil soluble resinous products for varnishes, paints, etc. They can be treated so that phenolic groups are converted to ether groups, for example, by reacting with diethylsulphate and sodium hydroxide, the latter either in water or alcohol solution or in powdered form. These double phenols, the products of the above reactions, can be sulphonated and used for wetting agents, dye bases and perfume bases.

It is considered that in the following examples of the sulphonation of products such as those made by Examples I to V above, the end reaction mass can be used for the sulphonation reaction, adding more sulphuric acid if necessary, and raising the temperature to bring it up to that at which sulphonation takes place, for example to about 110° C.

*Example 3.*—About equal parts by weight of sulphuric acid, concentrated, and of the dark red oil which is the reaction product of Example I are brought together and heated for about one hour at about 100° C. to about 110° C. after which the mixture is chilled to cause separation into two layers. The lower layer, which is mostly sulphuric acid and water, is separated from the upper layer which latter is dissolved in water, almost completely neutralized with calcium carbonate and filtered. The filtrate is evaporated to dryness to leave the reaction product which is for the most part the sulphonic acid of the di-phenol obtained by satisfying the unsaturated bond of the hydrocarbon side chain of cardanol with phenol.

*Example 4, general example.*—In a manner similar to that of Example 3 above the reaction products of Example II, III, IV and V can be sulphonated, using, as an illustrative example, equal parts by weight of sulphuric acid and the di-phenol. And in like manner the alkyl ethers of the di-phenols of Examples I to V, inclusive, can be sulphonated to produce products of the present invention, and these can be any of the di-ethers or any of the mono-ethers. Illustrative examples are any of the ethyl and propyl ethers of any of the di-phenols of the Examples I to V, inclusive.

*Example 5.*—Substantially equal parts by weight of concentrated sulphuric acid and of the ethyl ether of cashew nut shell liquid are heated together at about 110° C. for about one hour after which the reaction mass is chilled and the sulphuric acid and water layer is separated from the reaction product layer which latter is neutralized to the point of being slightly acid and then filtered. The filtrate is evaporated to dryness to obtain the solid product.

*Example 6.*—Substantially equal parts by weight of the propyl ether of cardanol and of sulphuric acid, concentrated, are handled in the same manner as in Example 4 to obtain the sulphonic acid of propyl ether of cardanol.

*Example 7.*—One hundred parts by weight of the double phenol of Example VI above and about two hundred parts by weight of concentrated sulphuric acid are heated together at about 100° C. until the reaction product is completely soluble in water. When cool the excess acid which separates is poured off and water added to dissolve the sulphonic acid. Calcium carbonate is then added to bring the solution to the neutral point and the precipitated calcium sulphate is filtered off. The calcium salt of the sulphonic acid is soluble in the water and goes with the filtrate which can be dried to obtain the dry salt of the sulphonic acid of the double phenol or the solution can be used as such.

*Example 8.*—About one hundred parts by weight each of the ethyl ether of cardanol and of concentrated sulphuric acid were heated together at about 110° C. for about forty minutes (twenty to sixty minutes) after which the mass was cooled, the unreacted sulphuric acid and water poured off. The sulphonic acid was then dissolved in water, being completely soluble, and neutralized with sodium hydroxide. The precipitated sodium sulphate was filtered, the sodium salt of the sulphonic acid of the ethyl ether of cardanol being completely soluble in the water and going with the filtrate.

*General example.*—Marking nut shell liquid and urushiol and ethers thereof can be used in the methods of Examples 1 to 6, inclusive, and Examples I to V, inclusive, to obtain similar sulphonic acids.

As is common to sulphonic acids the exact constitution of the final product is unknown and it is considered that they contain mixtures of mono-sulphonic acids and di-sulphonic acids and the amount or degree of sulphonation can be controlled by varying the amount of sulphuric acid used in the sulphonation process and this can be from about one molecular equivalent to about five molecular equivalents of sulphuric acid to each mole of aryl compound used, for example, but these proportions are not considered limiting, except in a practical way to obtain desirable yield of a desired product.

The new compounds of the present invention including the sulphonic acids described and illustrated by examples and also their metal salts particularly the alkali and the alkaline earth metal salts are useful generally where sulphonic acids and their salts are used and are particularly suitable in the wetting and detergency of textiles. Illustrative examples of the metal salts of the sulphonic acids of the present invention are the calcium sodium and the potassium salts of the sulphonic acids of Examples 1 and 2; of the double phenols of Example I, V and VI; of hydrogenated cashew nut shell liquid and of the ethyl ether of cardanol, but these are given merely as illustrative and not as limitations of the present invention.

Although different methods of handling the reagent materials in bringing them together and in handling the reaction products to remove from the reaction mass are described in the above examples this is to be considered as illustrative rather than limiting.

Other materials can be used for the same purpose as the sulphonic acids are the metal and ammonium salts thereof, and for wetting and detergent and allied uses they can be used interchangeably with the difference that one product can have some advantages over others in special applications. Said other materials which can be used for this purpose are the sulphonic acids of the acetates of phenols such as are described in my said copending application Serial Number 174,662.

The sulphonic acids and the metal salts of sulphonic acids of the present invention can be used with other sulphonic acids and salts of sulphonic acids in the wetting and detergency arts and in other uses, for example, with the sulphonic acids and sulphonic acid salts of phenol and the various cresols and the sulphonic acids and sulphonic acid salts of phenol and cresols can be made simultaneously with those of the high molecular mixture will result from the sulphonic acids (or weight phenols of the present invention to produce a mixture of sulphonic products. Such a salts thereof) made from the product of Example V where an excess of phenol is used over the molecular equivalent necessary to combine with the cashew nut shell liquid to make the double phenol. Also, as additional further examples, the amount of the phenol-cresol mixture in Example III can be increased to 150 parts instead of 104 parts or to 208 parts, or to 312 parts, using 300 parts of cashew nut shell liquid as in Example III, and, similarly, more than a mole of phenol or cresol can be used in Examples I, II and IV. Another specific illustrative example is 300 parts by weight of cashew nut shell liquid and 150 parts by weight of the phenol-cresol mixture of Example III. And the proportion of phenol in Example V can be increased or decreased.

*Example 9.*—The following example illustrated both (1) the use of an excess of a phenol free of an unsaturated hydrocarbon substituent over a molecular equivalent of a phenol having an unsaturated hydrocarbon substituent and (2) the direct procedure from the condensation of such two phenols with the aid of sulphuric acid as a condensing agent to the sulphonation of the condensation reaction product with the addition of more sulphuric acid to provide sufficient thereof for the sulphonation reaction.

About one hundred parts by weight of cardanol and fifty parts of phenol (carbolic acid) were dissolved together and to them were added gradually about fifteen parts by weight of concentrated sulphuric acid with stirring and cooling to keep the temperature below 25° C. The reaction mass was kept at normal temperature for about one-half hour to allow the condensation to proceed to completion, after which about one hundred and fifty parts by weight of concentrated sulphuric acid were added, the temperature was raised to about 110° C., and the mass was occasionally stirred. The reaction product was completely soluble in water in about one hour.

The reaction mass was cooled in a refrigerator whereupon sulphuric acid and water separated out. When the reaction product was almost solid the separated layer of sulphuric acid was poured off.

The reaction product was dissolved in about nine hundred parts by weight of water and then neutralized by the addition of sodium hydroxide. The sodium salt of the sulphonic acid of the condensation reaction product of cardanol and phenol (carbolic acid) dissolves in water with a clear solution.

Having thus described my invention, what I claim is:

1. The method of making a sulphonic acid from a phenol having an unsaturated hydrocarbon substituent on the nucleus thereof which comprises condensing said phenol with phenols free of unsaturated hydrocarbon substituents with the aid of sulphuric acid at a temperature below the sulphonation reaction range then making up any deficiency of sulphuric acid necessary for sulphonation and raising the temperature to within a sulphonation reaction range.

2. The method of making a sulphonic acid from a phenol having an unsaturated hydrocarbon substituent on the nucleus thereof which said phenol has the characteristic of polymerizing in the presence of sulphuric acid by interaction at the hydroxyl group of one molecule and at the unsaturated bond of the hydrocarbon substituent of another molecule, which comprises first rendering one of said positions unreactive to polymerization in the presence of sulphuric acid by satisfying said unsaturated bond with material selected from the group consisting of hydrogen and phenols having no unsaturated substituents on the nucleus, and then sulphonating.

MORTIMER T. HARVEY.